United States Patent [19]

Reynolds

[11] 4,257,084
[45] Mar. 17, 1981

[54] DISPLAY DEVICE

[76] Inventor: Christopher H. Reynolds, 314 Grove St., Westwood, Mass. 02090

[21] Appl. No.: 13,745

[22] Filed: Feb. 21, 1979

[51] Int. Cl.³ ............................................. F21V 7/04
[52] U.S. Cl. ...................................... 362/31; 362/26; 362/103; 362/800
[58] Field of Search ................... 362/31, 26, 27, 103, 362/339, 800

[56] References Cited

U.S. PATENT DOCUMENTS

| 2,195,672 | 4/1940 | Gerrells | 362/339 X |
|---|---|---|---|
| 2,566,026 | 10/1951 | Hughes, Jr. | 362/26 X |
| 2,585,503 | 2/1952 | Schulze | 362/26 X |
| 3,040,168 | 6/1962 | Stearns | 362/27 |
| 3,821,590 | 6/1974 | Kosman et al. | 362/800 X |
| 3,823,550 | 7/1974 | Bergey | 362/800 X |
| 3,828,182 | 8/1974 | Semonovitch | 362/31 X |
| 4,059,916 | 11/1977 | Tachihara et al. | 362/31 X |
| 4,082,029 | 4/1978 | Rumer, Jr. et al. | 362/31 X |

Primary Examiner—Peter A. Nelson
Attorney, Agent, or Firm—Abbott Spear

[57] ABSTRACT

A light-projection device for digital instrumentation consists of a one-piece body including reflective and diffusive surfaces and a chamber to locate a plurality of sources of varicolored light. Light from the sources is diffused to fill an entire line segment of the seven in a typical digit, with varicolored sources of light affording the potential for polychromatic display, thus enhancing the data with color to signify danger, normality, negative values, et cetera.

8 Claims, 4 Drawing Figures

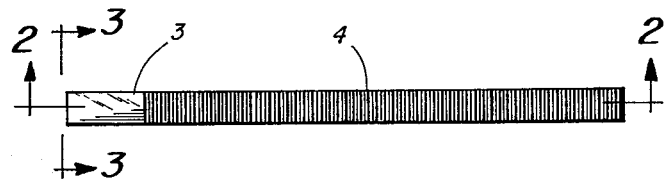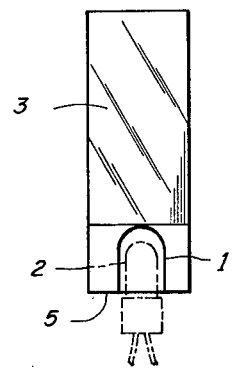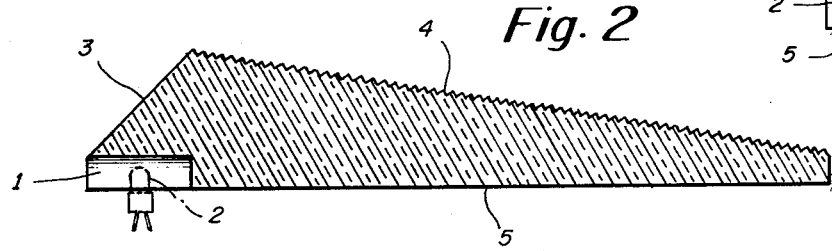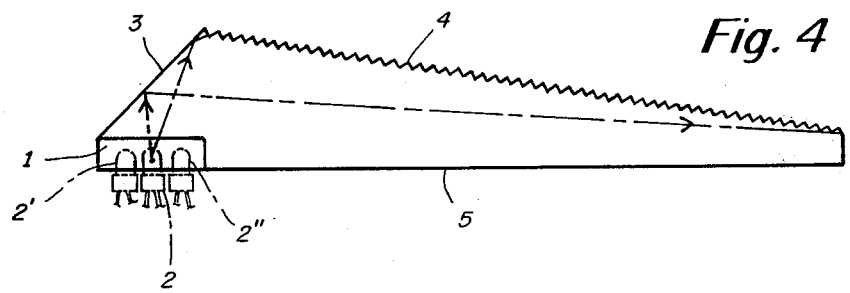

DISPLAY DEVICE

BACKGROUND FOR THE INVENTION

Conventional digital displays for digital watches, calculators, and other electronic instruments are constructed to create seven line-segments of light. These segments may be illuminated independantly of one another. By illuminating certain combinations of segments, the digits may be formed; displays with greater than seven segments may also project the letters.

A common type of digital display is that of the light-emitting-diode variety. A segment on such a display is actually not one continuous strip of light, as it appears but many collinear dots of light from as many collinear light-emitting-diodes (L.E.D.'s). These dots are assimilated into a continuous line-segment by the human eye. Sometimes this multitude of parts is augmented by a light-diffusing part located between the dots of light and their viewer(s).

Amidst these serried parts there is little or no unused space for the additional parts which would permit polychromatic display, which display requires that a plurality of colors of light seem to appear from the same location.

Polychromatic display will be appreciated for its ability to convey to the user—in addition to the letters, numerals, or characters themselves—a feeling, impulse, or emotion which will allow users to react more quickly and decisively to vital data.

THE PRESENT INVENTION

The general objective of the present invention is to provide a digital display which permits the color of the displayed data to change, an objective attained with a one-piece device consisting of a chamber which locates a plurality of varicolored sources of light, diffusing surfaces which scatter said light towards the user, and reflecting surfaces positioned so that light from the chamber is redirected to the aforementioned diffusing surfaces.

The device itself is one-piece. The light-sources may be an external entity, or they may be incorporated into the device so as to form an integrated unit.

In practice, a plurality of both reflecting and diffusing surfaces may be used to guide light aroung obstacles or to meet parameters of design or manufacture, always with the intent of ultimately diffusing light from relatively small sources to fill an area large enough to be useful for display purposes, an intention consonant with the general objective.

In use, the color of light cast to the user is changed simply by energizing at least one unlit source, while de-energizing the source or sources which were previously lit.

It is also an objective to provide the general objective without inconvenience to manufacturers nor with an undesirable multiplicity of parts.

These and other objectives of the invention will become apparent from the following description and claims taken in conjunction with the drawings.

BRIEF DESCRIPTION OF THE DRAWINGS

A preferred embodiment of the invention is illustrated by the accompanying drawings, and:

FIG. 1 is a plan view from above,

FIG. 2 is a cross-section in elevation along the indicated line 2—2 of FIG. 1, with a phantom light-source, FIG. 3 is an end-view in elevation along the indicated line 3—3 of FIG. 1, with an increase in scale for clarity, and with a phantom light-source, and, FIG. 4 is the same view as that of FIG. 2, save that this is a schematic rendering with three phantom light-sources at 2, 2',2", and with exemplary light-rays from light-source 2.

PREFERRED EMBODIMENT OF THE INVENTION

The projection device illustrated by the drawings is a preferred embodiment of the invention, comprised of a one-piece body with a chamber 1 which postions a plurality of varicolored sources of light, preferably light-emitting-diodes, shown at 2, 2', 2"; a reflecting surface 3, and a diffusing surface 4. The device is formed of translucent or transparent plastic. The reflecting surface may include a reflective coating, likewise the diffusing surface may include a diffusive coating.

Light from the sources 2, 2', 2" travels through the chamber 1 and is received by the roof thereof which is curved to avoid reflection and to facilitate efficient absorption of the light. Some of the light-rays travel directly to the diffusing surface 4, while the majority meets the reflecting surface 3 at an angle greater than the critical angle of total reflection and is totally internally reflected to the diffusing surface 4, which has prismatic serrations, recognized by those skilled in the art, which direct the light in the general direction of the user. The mounting surface 5 is fastened to circuit board which also anchors the light-sources 2, 2', 2", if said light sources 2, 2', 2" are separate from the device.

In practice, seven such devices are arrayed to form a digit. Cited only as an example of a potiential use, a digital speedometer with these devices with red and green light-sources would use the green sources when speed is below our national limit of fifty-five miles per hour; while a speed in excess of the legal limit would incur that the display project red numerals as the red sources would be used. An additional color would be used to inform of an engine malfunction.

While the preferred embodiment is described and illustrated herein, certain changes and alterations may appear to those skilled in the art to which this invention relates during its manufacture of same, and therefore the right is reserved to make such alterations and changes as shall fairly fall within the the scope of the appended claims.

I claim:

1. A light-projecting device comprising an integral unit of material that is at least translucent, said unit including light-diffusing surfaces, a chamber dimensioned to accommodate a plurality of sources of varicolored light, and reflecting surface disposed at an angle relative to said light diffusing surfaces such as to reflect by means of total internal reflection the light cast from the chamber to said diffusing surfaces which ar textured to cast said light towards the user.

2. The device of claim 1 in which the reflective surface includes a reflective coating.

3. The device of claim 1 in which the diffusing surfaces include a diffusive coating.

4. The device of claim 1 and means supporting a plurality of varicolored light sources in said chamber.

5. The device of claim 4 in which the light sources are light-emitting-diodes.

6. The device of claim 1 in which the reflecting surface is aligned with said light diffusing surfaces and disposed to define with the proximal end portion thereof an obtuse angle, and said proximal end at least partly overlying said chamber.

7. The device of claim 4 in which the light sources include a plurality of monochromatic light sources for each color.

8. A plurality of the devices of claim 1 configured to form symbols, digits, numerals, or characters so as to be useful for the display thereof.

* * * * *